Figure 2:
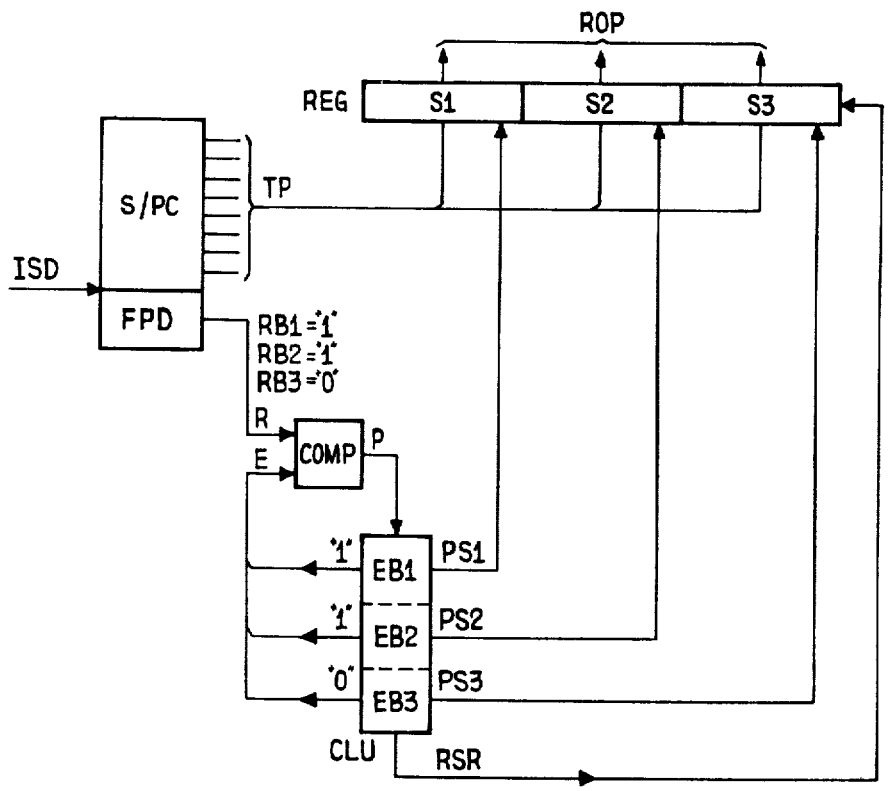

United States Patent [19]

Isaacs

[11] 4,035,601
[45] July 12, 1977

[54] ELECTRICAL CIRCUIT ARRANGEMENTS RESPONSIVE TO SERIAL DIGITAL SIGNALS FORMING MULTI-BYTE DATA-WORDS

[75] Inventor: Charles Allan Isaacs, Wirral, England

[73] Assignee: Plessey Handel und Investments A.G., Zug, Switzerland

[21] Appl. No.: 587,695

[22] Filed: June 17, 1975

[30] Foreign Application Priority Data

June 18, 1974 United Kingdom ............ 26885/74

[51] Int. Cl.² .......................................... H04L 7/00
[52] U.S. Cl. ............................... 178/69.1; 328/72
[58] Field of Search ............... 179/15 BS; 178/53.1, 178/69.5 R; 328/72, 75; 340/168 B, 168 C, 168 CC

[56] References Cited

U.S. PATENT DOCUMENTS

| | | | |
|---|---|---|---|
| 3,730,998 | 5/1973 | Schmidt et al. | 178/69.5 |
| 3,883,729 | 5/1975 | de Cremiers | 178/15 BS |

Primary Examiner—Benedict V. Safourek
Attorney, Agent, or Firm—Fleit & Jacobson

[57] ABSTRACT

Envisages the use of a format of serial digital signalling in which each data word comprises a predetermined number of bytes formed by bits of substantially uniform duration and in which each byte comprises a "start" bit of a first binary significance (e.g. 0) a "stop" bit having a second binary significance (e.g. 1) and an identical plurality of "data" bits immediately succeeding said "start" bit and in which the final byte of the data-word is characterized in that it has an additional bit having said first binary significance 0 interposed between last "data" bit and the "stop" bit thereof. The reading of that bit immediately succeeding the last "data" bit of each byte of each data-word of a transmission produce a so-called synchronizing pulse-sequence comprising bits of said second significance for all bytes except that last and a bit of said first significance for the last byte.

A response circuit is provided normally to maintain byte-to-byte synchronization. If de-synchronization is detected the data-word involved is completely cancelled and the circuit is set for re-synchronization preparatory to commencement of next data-word.

4 Claims, 2 Drawing Figures

ELECTRICAL CIRCUIT ARRANGEMENTS RESPONSIVE TO SERIAL DIGITAL SIGNALS FORMING MULTI-BYTE DATA-WORDS

The present invention relates to the provision of synchronising facilities for electrical circuit arrangements responsive to serial digital signals forming multi-byte data-words.

The object of the invention is to provide simple and reliable means which under normal working conditions will preserve working synchronisation of a digital signalling response circuit with respect to the format of the applied digital signal and to detect and correct departures from synchronous working. The invention specifically concerns a digital-data transmission systems using a novel format of serial digital signals such that each data-word comprises a predetermined number of bytes formed by bits of substantially uniform duration and each byte comprises a "start" bit of a first binary significance (e.g. 0) a "stop" bit having a second binary significance (e.g. 1) and an identical plurality of "data" bits immediately succeeding said "start" bit but the final byte of the data-word has an additional bit having said first binary significance interposed between last "data" bit and the "stop" bit thereof and a sequence of frame or synchronising-pulses is formed by that bit immediately succeeding the last "data" bit of all successive bytes of a data-word. This signalling format will hereinafter be referred to as a signalling format of the kind referred to.

Also according to the invention the signalling response circuit includes (i) register means for the storing of the data content of each byte of a received data-word, (ii) control logic means for producing, preparatory to reception of each byte of the data-word, either a first condition indicating that the byte currently expected is other than the last byte of a data-word or a second condition indicating that the byte expected is the last byte of a data-word, (iii) detector means for extracting from said incoming signals, pulse having time appearances appropriate to a synchronising-pulse sequence, and (iv) a comparison device operative under control of aforesaid extracted each pulse and the prevailing said first or second condition to assess the presence or absence of a synchronisation error in relation to any currently received byte of a data-word and to produce a first or second output signal appropriate to said presence and absence respectively, said output signal being operative over said control logic means to determine the mode of operation of the register means.

According to a feature of the invention the comparison device is operative in the presence of such error to cause cancellation of the particular data-word and to exercise such control upon the control logic means that, when reception of the particular data-word has been completed, the circuit is ready for synchronous reception of the bytes of the next data-word.

According to another feature of the invention said control logic means comprises one stage for each byte of the data-word, the stages being set on a mutually-exclusive basis and that stage which is set is effective when other than the last or the last in connecting a first or second signal respectively to said comparison device and in connecting an enabling signal to a particular byte-storage section of said register means.

According to yet another feature of the invention said control logic means is controlled (a) for the cyclically setting of its stages by a driving signal generated by said comparison means each time a received synchronising pulse is in conformity with a said first or second signal applied thereto, and (b) to cause the first stage to be set, if not already so, by an alternative pulse generated by said comparison means in the event of an applied pulse and signal not being in conformity; said alternative pulse causing a re-set pulse to be applied to said register means.

The invention will be better understood from the following description of methods of carrying it into effect which should be read in conjuction with the accompanying drawings.

Figure 1:
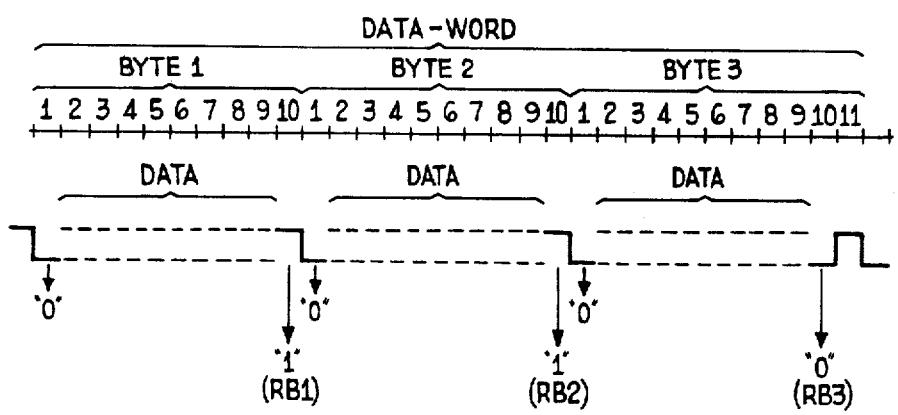

Of the drawings FIG. 1 illustrates a typical digital-pulse format of a data-word envisaged in the implementation of the present invention, whereas FIG. 2 represents, in simplified form, a circuit arrangement for use in the reception of data-words having the format alluded to.

Considering FIG. 1 the digital-pulse format embraces a 31-bit data-word spread over substantially identical timeslots. The data-word comprised three successive bytes designated BYTE 1, BYTE 2 and BYTE 3 containing ten, ten and eleven bits respectively. The first bit (number 1) of each byte constitutes the so-called "start" bit of the byte, and in each case has the binary significance 0. Bits 2 to 9 of each byte accommodate the actual data of the byte (arbitrarily as "1's" and "0's") so that an aggregate of 24 data bits, as distinct from control and signalling bits, are provided for in the data-word. Bit 10 of BYTE 1 and BYTE 2 and bit 11 of BYTE 3 are the so-called "stop" bits for the respective bytes and in each case carry binary 1 significance to enable an immediately-following change to 0 to be readily interpreted as the start condition for next byte. The "added" bit 10 of BYTE 3, with its binary 0 significance and interposed between the last data bit and the "stop" bit, is that bit which renders the last byte (BYTE 3) obviously different from all preceding bytes of the data-word, regardless of the 8-bit data sections. Accordingly under proper working conditions the reading of bit 10 of each of the bytes BYTE 1, BYTE 2 and BYTE 3, in succession forms a coded signal sequence 110 which is to be used for synchronisation purposes.

Considering the outline circuit arrangement shown in FIG. 2, it is intended for use in the reception and manipulation of digital signals generally having the format of FIG. 1. Each serial 3-byte data-word which should have the format mentioned, is forthcoming over incoming path ISD, and may well have been derived by interface equipment from a serial signal-sequence of a more suitable form for inter-station transmission purposes. However, the signals received over path ISD are passed to equipment involving a serial-to-parallel converter S/PC and a frame-pulse detector FPD. The converter is operative, in known manner, to capture the 8-bit data-section of each "byte" and to extend appropriate binary signals individually to the eight conductors of the transfer path TP in readiness for storage in the relevant 8-bit section (S1, S2 or S3) of the 24-bit register REG. The frame-pulse detector FPD is responsive to and reproduces the frame pulse RB1, RB2 or RB3, of each byte. As already stated, each frame pulse is the 10th pulse of the particular byte, and (for a true transmission) in the case of BYTE 1 and BYTE 2 it is the "stop" pulse with binary value 1, whereas in the case of BYTE 3 it is the pulse preceding the "stop" pulse and has binary value 0. Corresponding frame pulses derived from the detector FPD are applied as and when received to lead R of the comparator device COMP. The latter also receives binary signals over its second input lead E from the control logic unit CLU according to which of the three bytes of a data-word, as assessed by it, is being currently expected. The unit CLU is controlled by the output of comparator and may be considered as comprising three or circuit sections stages EB1, EB2 and EB3 arranged under normal synchronous working conditions to be cyclically in that order activated on a mutually-exclusive basis. With stage EB1 activated, section S1 of register REG is exclusively primed over lead PS1 in readiness for acceptance of the 8-bit data content of a BYTE 1, and signal 1 is applied exclusively to lead E of the comparator to signify "expect BYTE 1". With stage EB2 activated, register-stage S2 is exclusively primed over lead PS2 for acceptance of data of BYTE 2 and again signal 1 is applied exclusively to said E lead, now to signify "expect BYTE 2". On the other hand with stage EB3 activated, register stage 3 is exclusively primed over lead PS3 in respect of the data content of BYTE 3, and the alternative signal 0 is connected exclusively to lead E of the comparator to signify "expect BYTE 3".

The particular state of the output of the comparator COMP is, of course, determined by the state of the signals on its two input leads R and E. As noted from FIG. 2, the signal at lead R may be either 1 or 0, as determined by the frame pulse detector FPD, and from FIG. 1, it may be seen that if the word is in synchronism, the sequence of signals on lead R will be 1, 1, or 0. Similarly the state of the signal on lead E, which indicates the currently expected byte, may be either 1, or 0. Again, if the word is in synchronism, the signals on line E will be 1, 1, 0; as determined respectively by the stages of the control logic unit EB1, EB2, and EB3. As stated above, each stage is mutually exclusive and the last two stages may be arrived at only in a sequential manner. That is, EB2 may only be activated after EB1 has successfully been compared and EB2 may only be activated after EB1 and EB2 have both been successfully compared.

The comparator COMP produces, at its output lead P, a particular signal (to be referred to as an "OK" signal) when the signals received at both input leads R and E are identical (1 or 0) but if the two input signals are different an "error" signal is produced. When an OK signal is applied to the control logic unit CLU it is operative so that the next in order of stages EB1, EB2 and EB3 is activated; the change being stage EB1 to EB2 to EB3 or EB3 to EB1 as the case may be. Immediately prior to the stage advancement of unit CLU, the 8-bit data content of the received byte is transferred into that section S1, S2 or S3 of the register which was primed at that time.

The control logic unit is so organized that when it receives an error signal instead of an OK signal it reverts to, or stays in, such a state that stage EB1 is exclusively actuated, and moreover a "register reset signal" of short duration is applied to lead RSR extending to the reset lead of the register. Under these circumstances the total content of the register is cancelled without being used.

The function of the circuit arrangements in respect of an incoming data-word when synchronism prevails is summarised in TABLE A:-

TABLE A

| BYTE EXPECTED | LOGIC STAGE ACTIVATED | REGISTER SECTION PRIMED | BYTE RECEIVED | COMPARATOR LEAD STATES | | | CONTROL LOGIC CHANGE |
|---|---|---|---|---|---|---|---|
| | | | | E | R | P | |
| 1 | EB1 | S1 | 1 | 1 | 1 | OK | EB1 to EB2 |
| 2 | EB2 | S2 | 2 | 1 | 1 | OK | EB2 to EB3 |
| 3 | EB3 | S3 | 3 | 0 | 0 | OK | EB3 to EB1 |

Accordingly the data content of each byte is stored immediately after reception, and it may be taken that when the data, appertaining to the three bytes of the data-word, has been stored, it is transferred for external utilisation over path ROP under control of means not shown. Each of a succession of data-words forthcoming to the circuit arrangements whilst the usual state of synchronisation persists are handled in identical manner.

The situation produced when a frame pulse error (RB1) is detected in respect of BYTE 1 of any data-word is summarised in TABLE B following:-

TABLE B

| BYTE EXPECTED | LOGIC STAGE ACTIVATED | REGISTER SECTION PRIMED | BYTE RECEIVED | COMPARATOR LEAD STATES | | | CONTROL LOGIC CHANGE |
|---|---|---|---|---|---|---|---|
| | | | | E | R | P | |
| 1 | EB1 | S1 | 3 | 1 | 0 | Error | EB1 (no change) |
| 1 | EB1 | S1 | 2 | 1 | 1 | OK | EB1 to EB2 |
| 2 | EB2 | S2 | 3 | 1 | 0 | Error | EB2 to EB1 |

In this case the register is reset and the whole data-word cancelled by register-reset signalling over lead RSR without any transfer over the multiconductor output path being effected. However it is to be noted that after completion of the 3-byte sequence, the logic state is such that stage EB1 is in the activated condition exclusively, in anticipation of the next data-word being received synchronously.

When a frame-pulse error (RB2) is detected in respect of BYTE 2 of the data-word the functional sequence which results is summarised in TABLE C viz:-

TABLE C

| BYTE EXPECTED | LOGIC STAGE ACTIVATED | REGISTER SECTION PRIMED | BYTE RECEIVED | COMPARATOR LEAD STATES | | | CONTROL LOGIC CHANGE |
|---|---|---|---|---|---|---|---|
| | | | | E | R | P | |
| 1 | EB1 | S1 | 1 | 1 | 1 | OK | EB1 to EB2 |
| 2 | EB2 | S2 | 3 | 1 | 0 | Error | EB2 to EB1 |

TABLE C-continued

| BYTE EXPECTED | LOGIC STAGE ACTIVATED | REGISTER SECTION PRIMED | BYTE RECEIVED | COMPARATOR LEAD STATES | | | CONTROL LOGIC CHANGE |
|---|---|---|---|---|---|---|---|
| | | | | E | R | P | |
| 1 | EB1 | S1 | 3 | 1 | 0 | | Error EB1 (no change) |

Cancellation of the whole data-word again takes place as in the immediately proceeding example, and again with logic stage EB1 finally in the activated condition, the circuit is ready to resume synchronous working.

The following TABLE D summarises the functional sequence of the circuit on the advent of a frame-pulse error (RB3) appertaining to BYTE 3 of the data-word:-

TABLE D

| BYTE EXPECTED | LOGIC STAGE ACTIVATED | REGISTER SECTION PRIMED | BYTE RECEIVED | COMPARATOR LEAD STATES | | | CONTROL LOGIC CHANGE |
|---|---|---|---|---|---|---|---|
| | | | | E | R | P | |
| 1 | EB1 | S1 | 1 | 1 | 1 | | OK EB1 to EB2 |
| 2 | EB2 | S2 | 2 | 1 | 1 | | OK EB2 to EB3 |
| 3 | EB3 | S3 | 1 or 2 | 0 | 1 | | Error EB3 to EB1 |

As in the other cases of error detection, cancellation of the data-word containing the error is effected and with stage EB1 exclusive activated, the circuit is again available for synchronous working.

As regards all the foregoing tables it will be noted that regardless of whether an error condition for any byte is detected or not, the state of the control logic unit CLU after completion of the 3-byte sequence is such that stage EB1 is exclusively in the activated state. This implies that the circuit is ready to proceed with synchronous operation and that any error detected within a data-word results in the cancellation only of that data-word.

The circuit arrangement and the data-word format described above relate to 3-byte data words, but it should be understood that they may be readily modified to provide for data-words having a different number of bytes. Under these circumstances the general requirement for the data-word remains the same as is required in the foregoing 3-byte case, namely that an "additional" bit 0 is introduced exclusively into the last byte of the data-word at a position between the last data-bit and the "stop" bit, so that under correct working conditions an appropriate frame-pulse sequence is constituted by a 1 signal for all bytes except the last; the last byte providing a 0. The modifications to the circuit would merely involve the provision of that number of stages in the control logic unit CLU and that number of sections in the register which corresponds to the number of bytes in the data-words; for example for 4-byte data-words an additional register section S4 and an additional stage EB4 for the control logic unit would be provided.

Table E and F below demonstrate the functional response of the circuit arrangement adapted for 2-byte and 4-byte data-word working respectively:-

TABLE E

| STEP | BYTE EXPECTED | LOGIC STAGE ACTIVATED | REGISTER SECTION PRIMED | BYTE RECEIVED | COMPARATOR LEAD STATES | | | CONTROL LOGIC CHANGE |
|---|---|---|---|---|---|---|---|---|
| | | | | | E | R | P | |
| 1 | 1 | EB1 | S1 | 1 | 1 | 1 | | OK EB1 to EB2 |
| 2 | 2 | EB2 | S2 | 2 | 0 | 0 | | OK EB2 to EB1 |
| 3 | 1 | EB1 | S1 | 2 | 1 | 0 | | Error EB1 (no change) |
| 4 | 1 | EB1 | S1 | 2 | 1 | 0 | | Error EB1 (no change) |
| 5 | 1 | EB1 | S1 | 1 | 1 | 1 | | OK EB1 to EB2 |
| 6 | 2 | EB2 | S2 | 1 | 0 | 1 | | Error EB2 to EB1 |

In the above table steps 1 and 2 are alternated in respect of BYTE 1 and BYTE 2 of successive data-words for as long as synchronous transmission persists. Steps 3 and 4 relate to a data-word for which a real error is encountered in respect of BYTE 1, whereas steps 5 and 6 relate to a data-word for which a real error is encountered in respect of BYTE 2. It is to be noted that the state of the control logic unit following execution of steps 2, 4 or 6 is such that stage EB1 is in the activated state to maintain or permit synchronisation.

TABLE F

| STEP | BYTE EXPECTED | LOGIC STAGE ACTIVATED | REGISTER SECTION PRIMED | BYTE RECEIVED | COMPARATOR LEAD STATES | | | CONTROL LOGIC CHANGE |
|---|---|---|---|---|---|---|---|---|
| | | | | | E | R | P | |
| 1 | 1 | EB1 | S1 | 1 | 1 | 1 | | OK EB1 to EB2 |
| 2 | 2 | EB2 | S2 | 2 | 1 | 1 | | OK EB2 to EB3 |
| 3 | 3 | EB3 | S3 | 3 | 1 | 1 | | OK EB3 to EB4 |
| 4 | 4 | EB4 | S4 | 4 | 0 | 0 | | OK EB4 to EB1 |
| 5 | 1 | EB1 | S1 | 4 | 1 | 0 | | Error EB1 (no change) |
| 6 | 1 | EB1 | S1 | 2 | 1 | 1 | | OK EB1 to EB2 |
| 7 | 2 | EB2 | S2 | 3 | 1 | 1 | | OK EB2 to EB3 |
| 8 | 3 | EB3 | S3 | 4 | 1 | 0 | | Error EB3 to EB1 |
| 9 | 1 | EB1 | S1 | 1 | 1 | 1 | | OK EB1 to EB2 |
| 10 | 2 | EB2 | S2 | 4 | 1 | 0 | | Error EB1 |
| 11 | 1 | EB1 | S1 | 3 | 1 | 1 | | OK EB1 to EB2 |
| 12 | 2 | EB2 | S2 | 4 | 1 | 0 | | Error EB2 to EB1 |
| 13 | 1 | EB1 | S1 | 1 | 1 | 1 | | OK EB1 to EB2 |

TABLE F-continued

| STEP | BYTE EXP- ECTED | LOGIC STAGE ACTIVATED | REGISTER SECTION PRIMED | BYTE REC- EIVED | COMPARATOR LEAD STATES E | R | P | CONTROL LOGIC CHANGE |
|---|---|---|---|---|---|---|---|---|
| 14 | 2 | EB2 | S2 | 2 | 1 | 1 | OK | EB2 to EB3 |
| 15 | 3 | EB3 | S3 | 4 | 1 | 0 | Error | EB3 to EB1 |
| 16 | 1 | EB1 | S1 | 4 | 1 | 0 | Error | EB1 (no change) |
| 17 | 1 | EB1 | S1 | 1 | 1 | 1 | OK | EB1 to EB2 |
| 18 | 2 | EB2 | S2 | 2 | 1 | 1 | OK | EB2 to EB3 |
| 19 | 3 | EB3 | S3 | 3 | 1 | 1 | OK | EB3 to EB4 |
| 20 | 4 | EB4 | S4 | 1,2 or 3 | 0 | 1 | Error | EB4 to EB1 |

It can be deduced from the above table that when the system is operating in its usual synchronous mnner steps 1, 2, 3 and 4 are involved cyclically for each successive 4-byte data words. The table also demonstrate the effect of a real error encountered at steps 5, 10, 15 and 20 in respect of BYTE 1, BYTE 2, BYTE 3 and BYTE 4 of data-words. Again it is to be noted that cancellation of the offending data-word is effected and that following execution of steps 4, 8, 12, 16 or 20 the circuit is ready to resume synchronous operation.

The invention is equally applicable to data-words having other than an 8-bit "data" content for each bit, and for example the data portion of each byte might well comprise five bits or six bits according to the prescribed code.

It is pointed out that the circuit may well be modified by the elimination of the serial-to-parallel converter S/PC while retaining the frame-pulse detector FPD, the comparator COMP and the control logic unit CLU. However the register shown, with its one section per byte and catering for parallel injection of the bytes, would be replaced by three electronic shift registers. These would have the serial data-signals connected to their input leads; storage of the data-bytes being effected by the successive shift-registers as determined by priming conditions derived over leads PS1, PS2 and PS3. Preferably the converter S/PC would be replaced by a device extending only "data" bits of the incoming serial signals to the shift-registers.

What we claim is:

1. In or for use in a digital-data transmission system, a signalling response circuit for incoming signals having a signalling format of the kind referred to and characterised in that it includes (i) register means for the storing of the data content of each byte of a received data-word, (ii) control logic means for producing, preparatory to reception of each byte of the data-word, either a first condition indicating that the byte currently expected is other than the last byte of a data-word or a second condition indicating that the byte expected is the last byte of a data-word and producing control signals connected to said register means, (iii) detector means for extracting from said incoming signals, pulses having time appearances appropriate to a synchronising-pulse sequence, (iv) a comparison device operative under control of each aforesaid extracted pulse and the prevailing said first or second condition to assess the presence or absence of a synchronisation error in relation to any currently received byte of a data-word and to produce a first or second output signal appropriate to said presence and absence respectively, said output signal being applied to said control logic means to cause said control logic means to produce either said first or second condition and said control signals.

2. A signaling response circuit as claimed in claim 1 in which said control logic means comprises one stage for each byte of the data-word, the stages being activated on a mutually-exclusive basis under the control of said first or second output signals from said comparison device and according to which stage is set said control logic means is effective to connect a said first or a said second condition to said comparison device, and to connect one of said control signals to a particular byte-storage section of said register means; the first condition being produced when a stage other than the last stage is set whereas the second condition is produced only when the last stage is set.

3. A signalling response circuit as claimed in claim 2 in which said control logic means is controlled a) for the cyclically setting of its stages by said first output signal generated by said comparison means each time a received synchronising pulse is in conformity with a said first or second condition applied thereto, and b) to cause the first stage to be set, if not already so, by said second output signal generated by said comparison means in the event of a received pulse and said first or second condition not being in conformity; said second output signal causing a re-set pulse to be applied to said register means by one of said control signals from said control logic means.

4. A signalling response circuit as claimed in claim 1 in which the comparison device is operative as a result of the assessment to exercise such control upon the control logic means that upon receipt of said first output signal, said control logic means produces a one of said control signals connected to said register means for cancelling the registration of the current byte in the register means and said control logic means is caused to assume a state corresponding to the reception of the initial byte of a data-word.

* * * * *